US012764708B2

(12) United States Patent
Tenny et al.

(10) Patent No.: US 12,764,708 B2
(45) Date of Patent: Oct. 13, 2026

(54) METHOD AND DEVICE FOR USER EQUIPMENT POSITIONING

(71) Applicant: Huawei Technologies Co., Ltd., Shenzhen (CN)

(72) Inventors: Nathan Edward Tenny, San Diego, CA (US); Philippe Reininger, Issy les Moulineaux (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 272 days.

(21) Appl. No.: 18/758,869

(22) Filed: Jun. 28, 2024

(65) Prior Publication Data

US 2024/0430845 A1 Dec. 26, 2024

Related U.S. Application Data

(63) Continuation of application No. 17/284,217, filed as application No. PCT/CN2019/085442 on May 5, 2019, now Pat. No. 12,041,572.

(Continued)

(51) Int. Cl.
*H04W 64/00* (2009.01)
*H04L 67/10* (2022.01)
*H04W 24/10* (2009.01)

(52) U.S. Cl.
CPC ............. *H04W 64/00* (2013.01); *H04L 67/10* (2013.01); *H04W 24/10* (2013.01)

(58) Field of Classification Search
CPC ..... H04W 64/00; H04W 24/10; G01S 5/0009; G01S 5/0236; G01S 5/02213; G01S 5/04; H04L 67/10
See application file for complete search history.

(56) References Cited

U.S. PATENT DOCUMENTS 10,080,098 B1 9/2018 Edge
12,041,572 B2 * 7/2024 Tenny ................ G01S 5/02213
(Continued)

FOREIGN PATENT DOCUMENTS

CN 108541032 A 9/2018
WO 2018009340 A1 1/2018

OTHER PUBLICATIONS

3GPP TS 38.473 V15.3.0: "3rd Generation Partnership Project; Technical Specification Group Radio Access Network; NG-RAN; F1 application protocol (F1AP)(Release 15)", Sep. 2018, total 176 pages.

(Continued)

*Primary Examiner* — Siu M Lee
(74) *Attorney, Agent, or Firm* — Slater Matsil, LLP

(57) ABSTRACT

A method, device and system are provided for a user equipment positioning. In an embodiment, a central device of a radio access network (RAN) node, which comprises the central device and at least two distributed devices, receives positioning measurement request information from a location management function (LMF) device. The central device separately sends uplink signal configuration information to a first distributed device and a second distributed device of the at least two distributed devices in application protocol signaling The first and two distributed devices measure an uplink signal sent from a user equipment, and the two distributed devices separately sends a uplink signal measurement result in an application protocol signaling to the central device. The central device sends a positioning measurement result comprising the two uplink signal measurement results to the LMF device.

20 Claims, 9 Drawing Sheets

Related U.S. Application Data

(60) Provisional application No. 62/744,470, filed on Oct. 11, 2018.

(56) References Cited

U.S. PATENT DOCUMENTS

| | | | | |
|---|---|---|---|---|
| 2016/0157217 | A1* | 6/2016 | Xue | H04L 5/0094 370/330 |
| 2018/0199160 | A1 | 7/2018 | Edge | |
| 2018/0343635 | A1* | 11/2018 | Edge | H04W 64/00 |
| 2020/0068355 | A1 | 2/2020 | Edge | |
| 2021/0328747 | A1* | 10/2021 | Da | H04L 5/0058 |
| 2022/0053342 | A1 | 2/2022 | Kim et al. | |
| 2022/0053443 | A1* | 2/2022 | Kim | H04W 56/00 |

OTHER PUBLICATIONS

Ericsson, "On Rel. 15 NR positioning measurements", 3GPP TSG RAN1 Meeting #90Bis, R1-1718691, Prague, Czech Republic, Oct. 9-13, 2017, 3 pages.
Huawei, "(TP for NR BL CR for TS 38.413) Age of location information", 3GPP TSG-RAN3 Meeting #101, R3-184602, Aug. 20-24, 2018, 3 Pages, Gothenburg, Sweden.
Intel Corporation, et al., "Revised SID: Study on NR positioning support", 3GPP TSG RAN Meeting #81, RP-182155, (revision of RP-182141), Sep. 10-13, 2018, 6 Pages, Gold Coast, Australia.
QUALCOMM Incorporated, "Service Based Interfaces for Location support in 5GC", SA WG2 Meeting #122-BIS, S2-175715, August 21-35, 2017, Sophia Antipolis, France, 5 pages.

* cited by examiner

METHOD AND DEVICE FOR USER EQUIPMENT POSITIONING

CROSS-REFERENCE TO RELATED APPLICATIONS

This patent application is a continuation of U.S. patent application Ser. No. 17/284,217, filed on Apr. 9, 2021, now U.S. Pat. No. 12,041,572 issued on Jul. 16, 2024, and entitled "Method and Device for User Equipment Positioning," which is a national phase filing under section 371 of International Application No. PCT/CN2019/085442, filed on May 5, 2019, and entitled "Method and Device for User Equipment Positioning," which claims priority to U.S. Provisional Patent Application No. 62/744,470 filed on Oct. 11, 2018, and entitled "Method and Device for User Equipment Positioning," applications of which are incorporated herein by reference in their entireties.

TECHNICAL FIELD

The present disclosure relates to a wireless communications technology, in particular, to methods, devices, and systems for user equipment positioning.

BACKGROUND

A terminal positioning function is required to provide mechanisms to support or assist a calculation of a geographical position of a terminal. Terminal position knowledge can be used, for example, in support of radio resource management functions, as well as location-based services for operators, subscribers, and third-party service providers.

Positioning functionality provides a means to determine the geographic position and/or velocity of a terminal based on measuring radio signals. The position information may be requested by and reported to a client (e.g., an application) associated with the terminal, or by a client within or attached to the core network. The position information is reported in standard formats, such as those for cell-based or geographical co-ordinates, together with the estimated errors of the position and velocity of the terminal and, if available, the positioning method (or the list of the methods) used to obtain the position estimate.

5G network is a combination of a next generation radio network, which is also known as new radio (NR) network, and a next generation core network, which is also known as a fifth generation core (5GC). The NR network can provide target latencies under one millisecond, data rates of up to ten gigabits per second, extremely high network reliability. With location awareness becoming an essential feature of many service scenarios, positioning is consequently considered as an integral part of the system design of the NR network.

SUMMARY

In a first aspect, a method for a user equipment positioning is provided. In the method, a central device of a radio access network (RAN) node, which comprises the central device and at least two distributed devices, receives positioning measurement request information from a location management function (LMF) device. The central device sends uplink signal configuration information to a first distributed device and a second distributed device of the at least two distributed devices, wherein the uplink signal configuration information is sent to a first distributed device through a first application protocol signaling and the uplink signal configuration information is sent to a second distributed device through a second application protocol signaling. The central device further receives a positioning measurement report comprising a first uplink signal measurement report from the first distributed device though a third application protocol signaling and a second uplink signal measurement report from the second distributed device through a fourth application protocol signaling, and sends the positioning measurement report to the LMF device.

In this method, a distributed device, such as one of the first or second distributed device, receives the uplink signal configuration information in an application protocol signaling from the central device, measures an uplink signal sent from a user equipment in accordance with the uplink signal configuration, and sends an uplink signal measurement report in an application protocol signaling to the central device.

According to the method, due to the uplink signal configuration information can be configured by the central device to the at least two distributed devices, the at least two distributed devices of the RAN node can be can be coordinated to measure a uplink signal sent from the UE and realize the UE positioning in an easy and efficient way.

In a first possible implementation of the method according to first aspect, the central device hosts a radio resource control (RRC) layer of the RAN node, the at least two distributed devices hosts a physical layer of the RAN node, so that the central device may allocate radio resources and the distributed devices may independently measure the uplink signal from the user equipment to realize a positioning measurement. Optionally, the central device may host the RRC layer and a PDCP layer, the distributed device may host MAC layer, RLC layer, and the physical layer.

In a second possible implementation of the method according the first aspect and its implementation, the first uplink signal measurement report comprises a first angle of arrival (AoA) measurement result of an uplink signal sent from the use equipment, the second uplink signal measurement report comprises a second AoA measurement result of the uplink signal sent from the use equipment. The UE positioning is implemented according to the two AoA measurement results.

In a third possible implementation of the method according the first aspect and its implementations, the uplink signal comprises an uplink data or an uplink reference signal, such as a sounding reference signal.

In a fourth possible implementation of the method according the first aspect and its implementations, wherein the first application protocol signaling, second application protocol signaling, third application protocol signaling, and fourth application protocol signaling respectively comprise a F1 interface application protocol (F1AP) signaling.

In a second aspect, a RAN node is provided. The RAN node comprises a central device and at least two distributed devices. A F1 interface exists between the central device and each of the at least two distributed devices. The central device is configured to receive positioning measurement request information from a LMF device, send uplink signal configuration information to a first distributed device and a second distributed device of the at least two distributed devices, wherein the uplink signal configuration information is sent to a first distributed device through a first application protocol signaling and the uplink signal configuration information is sent to a second distributed device through a second application protocol signaling, receive a positioning measurement report comprising a first uplink signal measurement report from the first distributed device though a third application protocol signaling and a second uplink signal measurement report from the second distributed device through a fourth application protocol signaling; and send the positioning measurement report to the LMF device.

A distributed device is configured to receive the uplink signal configuration information in an application protocol signaling from the central device, measure an uplink signal sent from a user equipment in accordance with the uplink signal configuration, and send an uplink signal measurement report in an application protocol signaling to the central device.

In a third aspect, a central device of a RAN node is provided. The central device comprises an interface unit and a processing unit. The interface unit is configured to communicate with a core network device and with at least two distributed devices. Optionally, the interface unit supports two interfaces, one is the NG interface between the core network device and the central device; another is the F1 interface between the central device and the distributed device. The interface unit is configured to receive a positioning measurement initiation request message from the LMF device. The processing unit is configured to configure uplink signal configuration information upon the interface unit receives the positioning measurement initiation request message, and sends the uplink signal configuration information to at least two distributed devices in F1AP signaling through the interface unit. The processing unit is further configured to send the uplink signal configuration information in an RRC message to the UE.

In a fourth aspect, a distributed device of a RAN node is provided. The distributed device comprises an interface unit, a processing unit, and a transceiver unit. The interface unit is configured to communicate with a central device. The interface unit may support a F1 interface between the distributed device and the central device. The interface unit is configured to receive uplink signal configuration from the central device in F1AP singling. The interface unit is further configured to receive an AoA measurement indication in the F1AP signaling. The F1AP signaling may further comprise a transaction ID. The processing unit may be configured to receive an uplink signal from the UE in accordance with the uplink signal configuration information through the transceiver unit, and makes an AoA measurement on the uplink signal. The interface unit may further send an uplink signal measurement result to the central device.

In a fifth aspect, a network device is provided. The network device comprises a non-transitory memory storing instructions; and one or more processors in communication with the non-transitory memory, wherein the one or more processors execute the instructions to perform the method according to the first and second aspects and corresponding possible implementations.

In a sixth aspect, a non-transitory computer-readable media is provided. The non-transitory computer-readable media is configured to store computer instructions that when executed by one or more processors, cause the one or more processors to perform to the methods according to the first and second aspects and above possible implementations.

In a seventh aspect, a chipset system is provided. The chipset system includes at least one processor, used to implement the functionality of the above central device, the distributed device, or the RAN node. The chipset system may further include a memory for storing program instructions and data. The chipset system may be comprised by chipsets, and may also be comprised by at least one of chipsets and other discrete device.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The structure, manufacture and use of the presently embodiments are discussed in detail below. The specific embodiments discussed are merely illustrative of specific ways to make and use the disclosure, and do not limit the scope of the disclosure.

Figure 1:
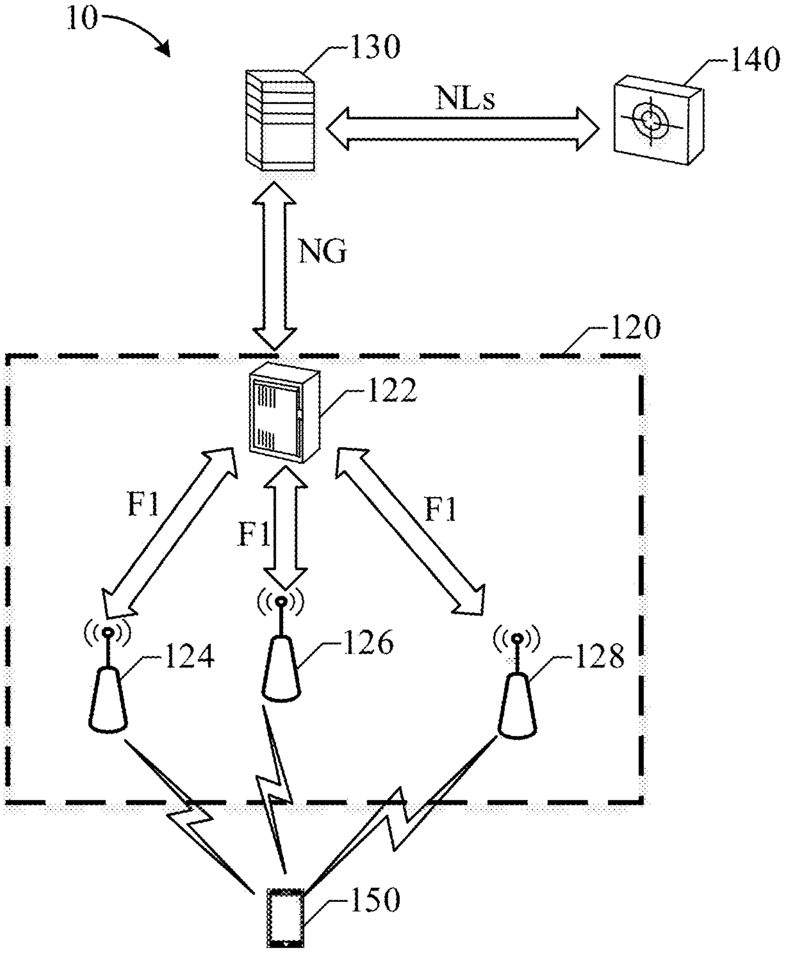
FIG. 1 illustrates a diagram of a communications system in an embodiment of the present disclosure.

FIG. 1 is a diagram of a communications system 10 in an embodiment of the present disclosure. The communication system 10 comprises a radio access network (RAN) node 120. A protocol stack for a control plane of the RAN node 120 may comprise radio resource control (RRC), packet data convergence protocol (PDCP), radio link control (RLC), medium access control (MAC), and physical (PHY) layers. A protocol stack for a user plane of the RAN node 120 may comprise service data adaptation protocol (SDAP), PDCP, RLC, MAC, and PHY layers. The RAN node 120 may comprise a central device 122 and one or more distributed devices, such as distributed devices 124, 126, and 128. One distributed device may support one or multiple cells. The central device 122 and connected distributed devices 124, 126, and 128 are visible to other RAN nodes and a core network device as one RAN node. The RAN node 120 in one example may be referred to as a next generation Node B (gNB). The central device 122 is also known as a centralized unit (CU), or a gNB-CU. The distributed device may be also known as a distributed unit (DU), or a gNB-DU.

Figure 2:
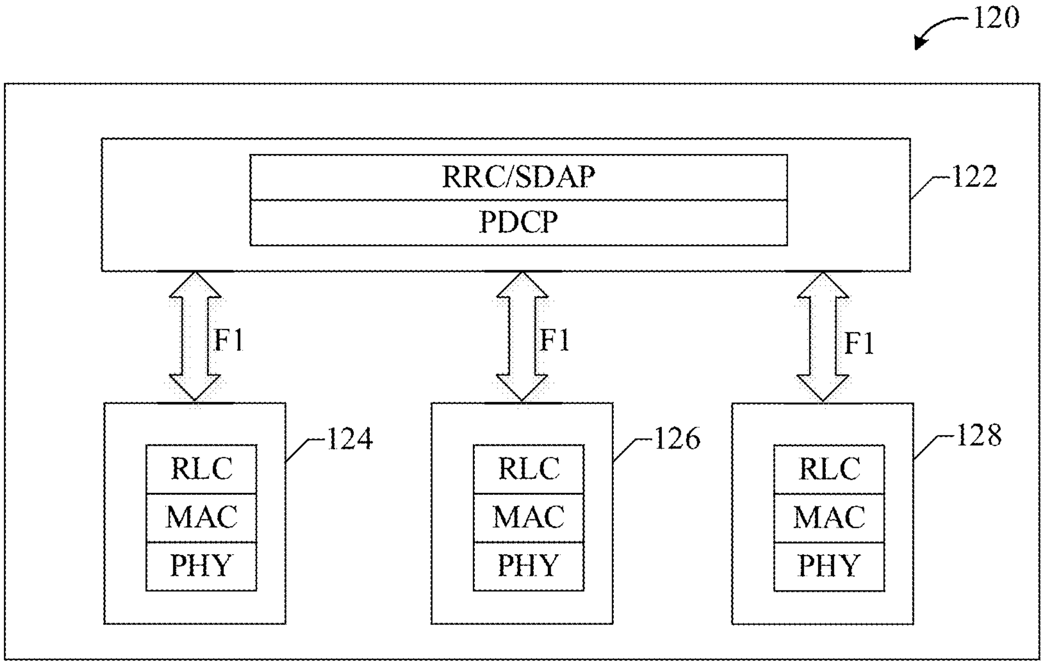
FIG. 2 illustrates a diagram of a protocol stack of an RAN node in an embodiment of the present disclosure.

FIG. 2 is a diagram of a protocol stack of the RAN node 120 in an embodiment. The central device 122 at least hosts the PDCP layer of the RAN node 120. Each of the distributed device 124, 126, and 128 at least hosts a physical layer of the RAN node 120. In some examples, the central device 122 may host PDCP and RRC/SDAP layers of the RAN node 120. In some examples, the distributed device 124, 126, or 128 hosts the RLC, MAC and PHY layers of the RAN node 120, and its operation is partly controlled by the central device 122.

As shown in FIG. 1, a user equipment (UE) 150 may access to the RAN node 120 through a serving distributed device, such as the distributed device 124 in one example. In embodiments of the present disclosure, the UE 150 may comprise a terminal, a mobile station, a subscriber unit, a station, or a terminal equipment. The UE 150 may be a cellular phone, a personal digital assistant, a modem, or a pad/tablet device. The UE 150 may also support wireless cellular communication. With the development of communications technologies and Internet of Things (IoT), any device that can access a wireless network and communicate with network side, or communicate with other devices directly or indirectly, could be the UE 150 in embodiments of the present disclosure. For example, a vehicle in a smart transportation system, an appliance in a smart home, a power meter reader, a power voltage monitor in a smart grid, or a video monitor in smart security network, etc.

The communications system 10 may further comprise a location management function (LMF) device 140. In embodiments of the present disclosure, the UE 150's position may be determined according to an angle of arrival (AoA) positioning via two distributed devices. The AoA may define the estimated angle of a user with respect to a reference direction. The reference direction for this measurement could be the geographical north, positive in a counter-clockwise direction. The AoA may be determined at a RAN node antenna for an uplink channel corresponding to this UE. The AoA positioning refers to a positioning in accordance with at least two AoAs of a signal sent from a source and estimated separately at different receiving ends.

The UE 150 may send an uplink signal for positioning, and may also make measurements of downlink signals from the RAN node 120 and other sources such as an evolved universal terrestrial radio access network (E-UTRAN), different global navigation satellite system (GNSS) and terrestrial beacon system (TBS) systems, wireless local area network (WLAN) access points, Bluetooth beacons, or UE barometric sensors. The UE 150 may also contain location services (LCS) applications, or access an LCS application either through communication with a network accessed by the UE or through another application residing in the UE 150. This LCS application may include the needed measurement and calculation functions to determine the UE 150's position with or without network assistance. The UE 150 may also, for example, contain an independent positioning function (e.g., global positioning system) and thus be able to report its position, independent of a radio access network transmissions. The UE 150 with an independent positioning function may also make use of assistance information obtained from the network.

The LMF device 140 manages the support of different location services for the UE 150, including positioning of the UE 150 and delivery of assistance data to the UE 150. The LMF device 140 may interact with the RAN node 120 for the UE 150 in order to obtain position measurements for the UE 150, including such as uplink measurements made by an RAN node and downlink measurements made by the UE 150 that were provided to an RAN node as part of other functions such as for support of handover. The LMF device 140 may interact with the UE 150 in order to deliver assistance data if requested for a particular location service, or to obtain a location estimate if that was requested.

For positioning of the UE 150, the LMF device 140 may decide on the position methods to be used, based on factors that may include the LCS client type, the required quality of service (QOS), UE positioning capabilities and RAN node positioning capabilities. The LMF device 140 then invokes these positioning methods in the UE and/or serving RAN node. The positioning methods may yield a location estimate for UE-based position methods and/or positioning measurements for UE-assisted and network-based position methods. The LMF device 140 may combine all the received results for a plurality of positioning methods and determine a single location estimate for the target UE (hybrid positioning). Additional information like accuracy of the location estimate and velocity may also be determined.

In the communications system 10, a core network device 130 is further comprised. The core network device 130 may provide access and mobility management function (AMF) and/or user plane function (UPF).

Although FIG. 1 illustrates one example of the communications system 10, various changes may be made to FIG. 1. The RAN node 120, core network device 130, the LMF device 140, and the UE 150 in the communications system 10 are one example, and the embodiments disclosed herein are not limited to the system 10 illustrated in FIG. 1. For example, the communications system 10 could include any number of UEs 150, RAN nodes 120, or other components in any suitable configuration such as core network elements, which are not shown in FIG. 1.

A NLs interface exists between the LMF device 140 and the core network device 130 and is transparent to all UE related and RAN node related positioning procedures. A NG interface exists between the RAN node 120 and the core network device 130 and is transparent to all UE related and RAN node related positioning procedures. The NLs interface is used as a transport link for a long term evolution (LTE) positioning protocol (LPP) or a new radio positioning protocol a (NRPPa). The NRPPa carries information between the RAN node 120 and the LMF device 140. The NRPPa protocol is transparent to the core network device 130. The core network device 130 routes NRPPa protocol data units (PDUs) transparently based on a routing identity corresponding to the LMF device 140 over the NG interface without knowledge of the involved NRPPa transaction. The NRPPa PDUs are carried over the NG interface either in UE associated mode or non-UE associated mode.

For RAN node related positioning procedures, the NG interface transparently transports both positioning requests from the LMF device 140 to the RAN node 120 and positioning results from the RAN node 120 to the LMF device 140.

In one embodiment of the present disclosure, the central device 122 and the distributed devices are connected via a F1 interface. The F1 interface provides means for interconnecting the central device 122 and the distributed device 124, 126, or 128 within the RAN node 120. The F1 interface supports the exchange of signaling between the endpoints, i.e., the central device 122 and distributed device 124, 126, or 128 within the RAN node 120. In addition the F1 interface supports data transmission to the respective endpoints. From a logical standpoint, the F1 interface is a point-to-point interface between the endpoints. A point-to-point logical interface is feasible even in the absence of a physical direct connection between the endpoints.

Figure 3:
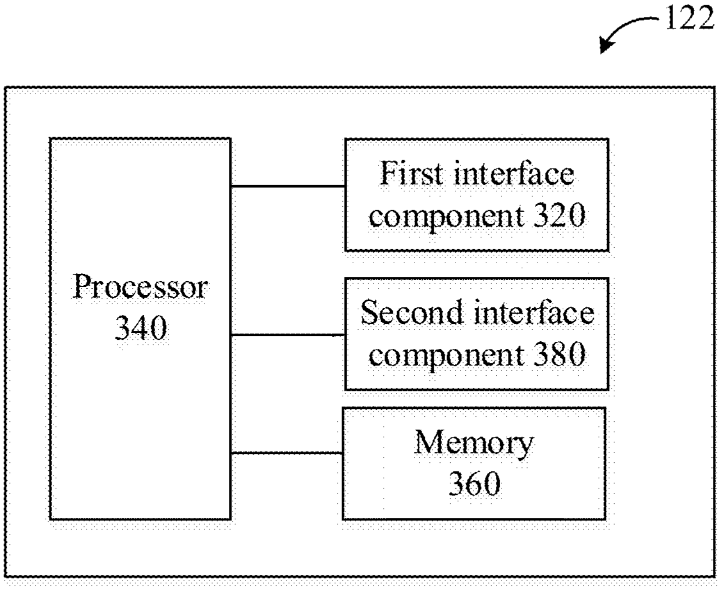
FIG. 3 illustrates a block diagram of a central device in an embodiment of the present disclosure.

FIG. 3 is a block diagram of the central device 122 in an embodiment of the present disclosure. As shown in FIG. 3, the central device 122 includes at least one first interface component 320, at least one processor 340, at least one memory 360, and at least one second interface component 380. The processor 340 implements various processing operations of the central device 122, such as PDCP layer, optionally, and RRC/SDAP layers processing. The processor 340 can also support the methods and teachings described in more details described in embodiments of the present disclosure. Each processor 340 includes any suitable processing or computing device configured to perform one or more operations. Each processor 340 could, for example, include a microprocessor, microcontroller, digital signal processor, field programmable gate array, or application specific integrated circuit.

The first interface component 320 includes any suitable circuitry for communicating with the core network device 130. In some examples, the first interface component 320 may support a NG interface. The second interface component 380 includes any suitable circuitry for communicating with the distributed device 124, 126, or 128. In some examples, the second interface component may support a F1 interface. Although shown as separate components, the at least one first interface component 320 and the second interface component 380 could be combined into one interface component.

Each memory 360 includes any suitable volatile and/or non-volatile storage and retrieval device(s). The memory 360 is non-transitory memory storage, in one embodiment. The memory 360 stores instructions and signal used, generated, or collected by the central device 122. For example, the memory 360 could store software or firmware instructions executed by the processor 340. Any suitable type of memory may be used, such as random access memory (RAM), read only memory (ROM), hard disk, optical disc, subscriber identity module (SIM) card, memory stick, secure digital (SD) memory card, or the like.

Figure 4:
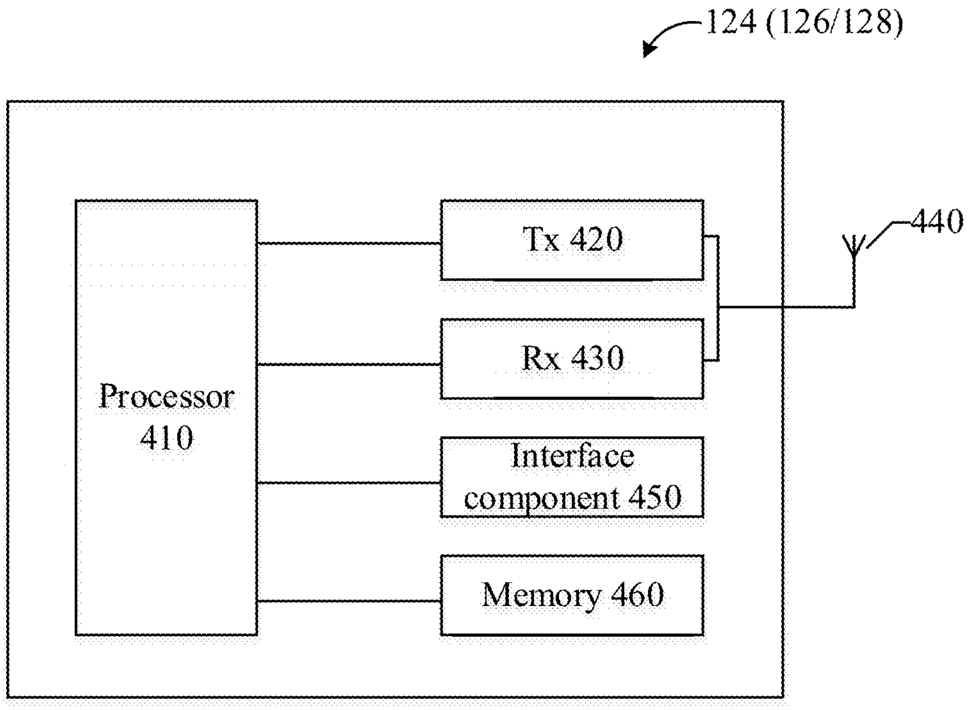
FIG. 4 illustrates a block diagram of a distributed device in an embodiment of the present disclosure.

FIG. 4 is a diagram of the distributed device 124, 126, or 128 in an embodiment of the present disclosure. As shown in FIG. 4, the distributed device 124, 126, or 128 includes at least one processor 410, at least one transmitter (Tx) 420, at least one receiver (Rx) 430, one or more antennas 440, one or more interface component 450, and at least one memory 460. The processor 410 implements various processing operations of the distributed device 124, 126, or 128, such as signal coding, signal processing, power control, input or output processing, positioning measurement, or any other functionality. The processor 410 can also support the methods and teachings described in more details described in embodiments of the present disclosure. Each processor 410 includes any suitable processing or computing device configured to perform one or more operations. Each processor 410 could, for example, include a microprocessor, microcontroller, digital signal processor, field programmable gate array, or application specific integrated circuit.

Each transmitter 420 includes any suitable circuitry for generating signals for wireless transmission to one or more UEs or other devices. Each receiver 430 includes any suitable circuitry for processing signals received wirelessly from one or more UEs or other devices. Although shown as separate components, the at least one transmitter 420 and the at least one receiver 430 could be combined into a transceiver. Each antenna 440 includes any suitable structure for transmitting and/or receiving signals. While a common antenna 440 is shown here as being coupled to both the transmitter 420 and the receiver 430, one or more antennas 440 could be coupled to the at least one transmitter 420, and one or more separate antennas 440 could be coupled to the at least one receiver 430.

Each interface component 450 includes any suitable circuitry for communicating with the central device 122. In some examples, the interface component 450 may support a F1 interface.

Each memory 460 includes any suitable volatile and/or non-volatile storage and retrieval device(s). The memory 460 is non-transitory memory storage, in one embodiment. The memory 460 stores instructions and signal used, generated, or collected by the distributed device 124, 126, or 128. For example, the memory 460 could store software or firmware instructions executed by the processor 410. Any suitable type of memory may be used, such as RAM, ROM, hard disk, optical disc, SIM card, memory stick, SD memory card, or the like.

In embodiments of the present disclosure, the signal may comprise a control signal and/or data signal. Namely, the signal may carry control plane information and/or user plane information.

Figure 5:
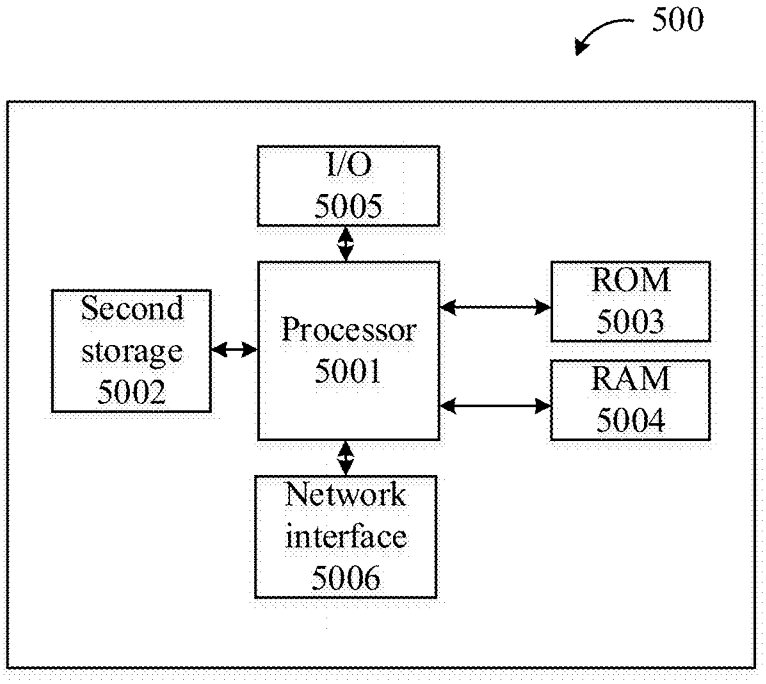
FIG. 5 illustrates a block diagram of a general-purpose network component in an embodiment of the present disclosure.

FIG. 5 is a block diagram of a general-purpose network component 500 in accordance with an embodiment of the present disclosure. As an option, the network component 500 may be implemented in the context of any devices of the communications system 10, for example, the central device 122, the distributed device 124, 126, or 128, the UE 150, the core network device 130, or the LMF device 140. However, it is to be appreciated that the network component 500 may be implemented in any desired environment. The network component 500 includes a processor 5001 that is in communication with memory devices including secondary storage 5002, and memory, such as ROM 5003 and RAM 5004, input/output (I/O) devices 5005, and a network interface 5006. Although illustrated as a single processor, the processor 5001 is not so limited and may comprise multiple processors. The processor 5001 may be implemented as one or more CPU chips, cores (e.g., a multi-core processor), FPGAs, ASICs, and/or DSPs, and/or may be part of one or more ASICs.

The secondary storage 5002 is typically comprised of one or more disk drives or tape drives and is used for non-volatile storage of signal and as an over-flow signal storage device if the RAM 5004 is not large enough to hold all working signal. The secondary storage 5002 may store programs/instructions that are loaded into the RAM 5004 when such programs are selected for execution. The ROM 5003 is used to store instructions and perhaps signals that are read during program execution. The RAM 5004 can be used to store signals and perhaps to store instructions. Access to both the ROM 5003 and the RAM 5004 is typically faster than to the secondary storage 5002. Computer programs or instructions may be stored in the secondary storage 5002, the 5OM 3003, and/or the 5AM 3004. In one embodiment, the processor 5001 may execute instructions in the secondary storage 5002, the ROM 5003, or the RAM 5004 to implement an of the functionality set forth in connection with the, the central device 122, the distributed device 124, 126, or 128, the UE 150, the core network device 130, or the LMF device 140.

In embodiments of the present disclosure, a F1 application protocol (AP) over the F1 interface provides signaling services between a central device and a distributed device that is required to fulfil a F1AP function. The F1AP services are divided into two groups: Non UE-associated services and UE associated services. The non UE-associated services are related to the whole F1 interface instance between the central device and distributed device utilizing a non UE-associated signaling connection. The UE associated services are related to one UE.

The F1AP can provide signaling services to realize a UE positioning, including the AoA positioning. F1AP signaling between a central device and a distributed device may comprise configuration information related to UE positioning, so that the central device and the distributed device may implement the positioning operation to a UE. The F1AP signaling may also carry measurement results related to the UE positioning to convey the measurement results from the distributed device to the central device.

In some examples, a F1AP elementary procedure may be used for transmitting configuration information related to UE positioning. The F1AP elementary procedure is a unit of interaction between a central device and a distributed device. The F1AP elementary procedures may be defined separately and are intended to be used to build up complete sequences in a flexible manner. The F1AP elementary procedures may be invoked independently of each other as standalone procedures, which can be active in parallel. In an AoA positioning, at least two distributed devices are involved into the positioning. A central device can configure or coordinate the configuration information to the at least two distributed devices so that the at least two distributed devices can make a positioning measurement. The at least two distributed devices may feedback the positioning measurement results to the central device. For a serving distributed device, the F1AP elementary procedure for configuring the configuration information may be an elementary procedure with a response, which means a response is required to confirm whether the procedure is successful, such as a context modification procedure. For a non-serving distributed device, the F1AP elementary procedure for configuring the configuration information may be an elementary procedure without a response, which means a signaling comprising the configuration information is considered successful.

In some examples, the central device 122 may configure uplink signal configuration information and transmit the uplink signal configuration information in F1AP signaling to at least two distributed devices. The at least two distributed devices may separately make an AoA measurement of an uplink signal sent from the UE 150 in accordance with the uplink signal configuration information included in the F1AP signaling. The distributed devices may further report the AoA measurement results to the central device 122 in F1AP signaling respectively. Thus, the central device 122 may forward the reported measurement results to the LMF device 140, and the LMF device 140 then can determine the position of the UE 150. Alternatively, the central device 122 may determine the position of the UE 150 in accordance with the reported measurement results, and report the position information of the UE 150 to the LMF device 140.

With the new F1AP procedures are introduced, a central device of a RAN node can configure the uplink signal configuration information to at least two distributed devices of the RAN node, at least two distributed devices of the RAN node can be can be coordinated to measure a uplink signal sent from the UE and realize the UE positioning according to the measurement results of the uplink signal which are measured at the two distributed devices. Such UE positioning does not need extra assistance data, procedure, or other network element, therefore, it is easy and efficient for the LMF device to provide the location service. Moreover, the air interface resource can be saved accordingly. In addition, according to the embodiments of the present disclosure, with the help of the application protocol signaling between the central device and the distributed devices, the positioning can be realized according to the uplink measurements of the uplink signal, the UE positioning can be realized with a low latency.

In some embodiments, the uplink signal sent by the UE 150 may be an uplink sounding reference signal (SRS), a data transmission signal, a dummy reference signal, or other uplink signal only if the signal could be detected by the distributed devices. Take the uplink SRS as an example, the uplink signal configuration information comprises the uplink SRS configuration information. The central device 122 may configure the uplink SRS to be used for the AoA positioning. The uplink SRS configuration information may comprise SRS resource information.

In one example, the SRS configuration information could be included in the F1AP signaling in the form of SRS configuration information element (IE). The SRS configuration IE is used to configure SRS transmissions. For example, the configuration may define a list of SRS resources and a list of SRS-Resource Sets. Each resource set defines a set of SRS resources. The network may trigger the transmission of the set of SRS resources using a configured aperiodic SRS resource trigger in, for instance, layer 1 (physical layer) downlink control information (L1 DCI).

The SRS configuration information may further include at least one of resource identity, SRS cyclic shift configuration, frequency domain position information that defines frequency domain position and configurable shift, frequency hopping information that includes a parameter capturing SRS frequency hopping, group or sequence information that includes a parameter for configuring group or sequence hopping, a periodicity and slot offset for the SRS resource, a phase-tracking-reference-signals (PTRS) port index for this SRS resource for non-codebook based uplink multiple input multiple output (MIMO), resource mapping information that indicates orthogonal frequency division multiplexing (OFDM) symbol location of the SRS resource within a slot including number of OFDM symbols, resource type that represents time domain behavior of SRS resource configuration, sequence identity used to initialize pseudo random group and sequence hopping, spatial relation information that indicates configuration of the spatial relation between a reference RS and the target SRS, transmission comb information that indicates comb value and comb offset, information for SRS power control, aperiodic SRS resource trigger, an identity of CSI-RS resource associated with this SRS resource set in non-codebook based operation, path loss reference RS information that indicates a reference signal (e.g. a CSI-RS configuration or a synchronization signal block) to be used for SRS path loss estimation, an offset in number of slots between the triggering DCI and the actual transmission of this SRS resource set, SRS power control adjustment state information, SRS resource identity list that indicates the identities of the SRS resources used in this SRS resource set, SRS resource set identity that indicates the resource set, or an usage information that indicates if the SRS resource set is used for beam management or used for either codebook based or non-codebook based transmission, etc.

Figure 6:
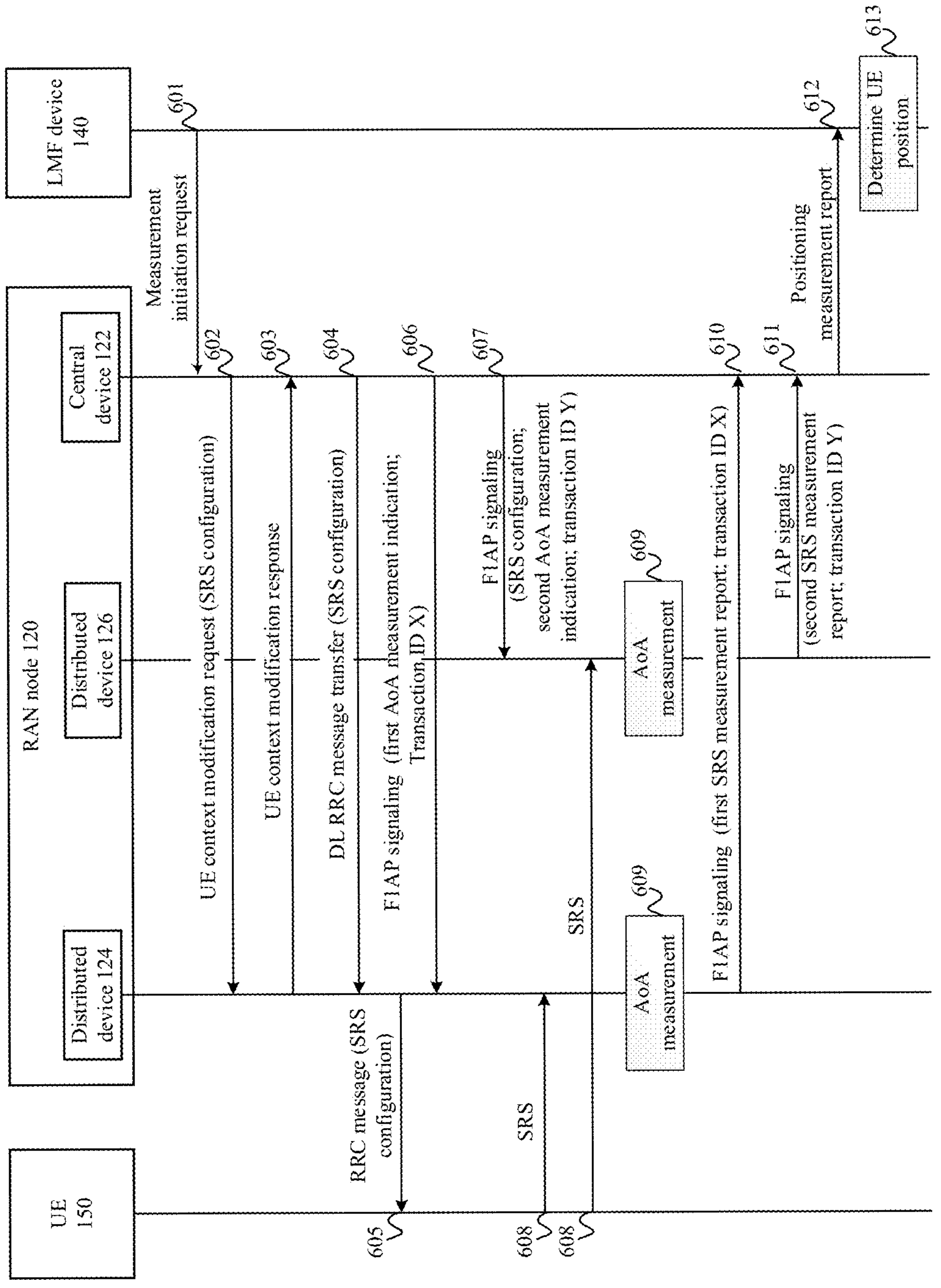
FIG. 6 illustrates a flow diagram of a UE positioning method in an embodiment of the present disclosure.

FIG. 6 is a flow diagram of a UE positioning method in an embodiment of the present disclosure. The RAN node 120 comprises a central device 122 and two distributed devices 124 and 126, in which the distributed device 124 is a serving distributed device of the UE 150. In this embodiment, the central device 122 can configure the SRS configuration information to the two distributed devices 124 and 126 in F1AP signaling. The UE 150's position can be determined according to AoA measurement results performed at the two distributed devices 124 and 126.

In operation 601, the central device 122 receives a positioning measurement initiation request message from the LMF device 140.

The LMF device 140 sends an NRPPa message, such as the positioning measurement initiation request message that includes positioning measurement request information, to the RAN node 120. The positioning measurement initiation request message is to enable the LMF device 140 to request a positioning measurement from the RAN node 120. The positioning measurement initiation request message includes indication of AoA measurements requested. Moreover, the request may further include whether the result is expected only once or periodically.

In the operation 601, the central device 122 receives the positioning measurement initiation request message from the LMF device 140 via a core network device 130. However, as described above, due to the NLs interface is transparent to all UE related and RAN node related positioning procedures and the NG interface is transparent to all UE related and RAN node related positioning procedures, the core network device 130 is not shown in FIG. 6.

In operation 602, the central device 122 sends a UE context modification request message including uplink SRS configuration information to the serving distributed device 124.

Upon receiving the positioning measurement initiation request message from the LMF device 140, the central device 122 initiates a F1AP elementary procedure, such as a UE context modification procedure. The central device 122 sends a F1AP signaling comprising the UE context modification request message. The UE context modification request message is initiated by the central device 122. The UE context modification request message is to modify the established UE context, e.g., establishing, modifying or releasing radio resources. The procedure uses UE-associated signaling. In on example, the UE context modification request message comprises uplink SRS configuration information as described above, such as the SRS configuration IE.

In operation 603, the distributed device 124 sends a UE context modification response message to the central device 122.

In one example, upon reception of the UE context modification request message, the distributed device 124 performs the modifications, and if successful reports the update in an UE context modification response message to the central device 122.

In one embodiment, the operations 603 and 604 are optional. The SRS configuration information also may be transmitted from the central device 122 to the distributed device 124 via other F1AP elementary procedures, such as UE context management procedures. In one example, the SRS configuration information may be transmitted via a UE context setup procedure through F1AP signaling between the central device 122 and the distributed device 124, the SRS configuration information may be carried in a UE context setup request message. Alternatively, another F1AP signaling, such as a SRS configuration information-dedicated F1AP signaling may be involved to transfer the SRS configuration information.

In some example, the SRS configuration information can be included in a CU to DU RRC Information IE, this IE contains the RRC Information that are sent from a CU to a DU.

In operation 604, the central device 122 sends the SRS configuration information in a downlink (DL) RRC message transfer message to the distributed device 124.

The DL RRC message transfer message is to transfer an RRC message, and the procedure uses UE-associated signaling. The RRC message comprises the SRS configuration information.

In operation 605, the distributed device 124 sends an RRC message to the UE 150.

The RRC message sent from the distributed device 124 to the UE 150 includes the SRS configuration information.

Optionally, in operation 606, the central device 122 sends a F1AP signaling comprising an AoA measurement indication to the distributed device 124.

Moreover, the F1AP signaling may further comprise a transaction identity (ID), which could be labelled as transaction ID X. The transaction ID X is associated with the F1AP signaling of operation 606.

In operation 607, the central device 122 sends a F1AP signaling comprising the SRS configuration information and optionally an AoA measurement indication to the distributed device 126.

The F1AP signaling may further comprise a transaction ID Y. The transaction ID Y is associated with the F1AP signaling of operation 607.

Alternatively, the transaction IDs may be transmitted in different F1AP rather than the F1AP signaling referred in operations 606 and 607.

It is noted that, in the embodiments of present disclosure, the operations 606 and 607 could be performed simultaneously. Alternatively, the operation 606 is performed prior to the operation 607, or the operation 607 may be performed prior to the operation 606. There is no specific sequence is mandatory between the operations 606 and 607.

In operation 608, the UE 150 sends an uplink SRS according to the SRS configuration information received in operation 605.

In operation 609, the distributed device 124 and the distributed device 126 respectively make an AoA measurement of the uplink SRS sent by the UE 150.

The distributed device 124 and the distributed device 126 receive the SRS sent from the UE 150 according to the SRS configuration information. Based on the SRS configuration information, the distributed devices 124 and 126 can obtain resource to receive the SRS from the UE 150.

Figure 7:
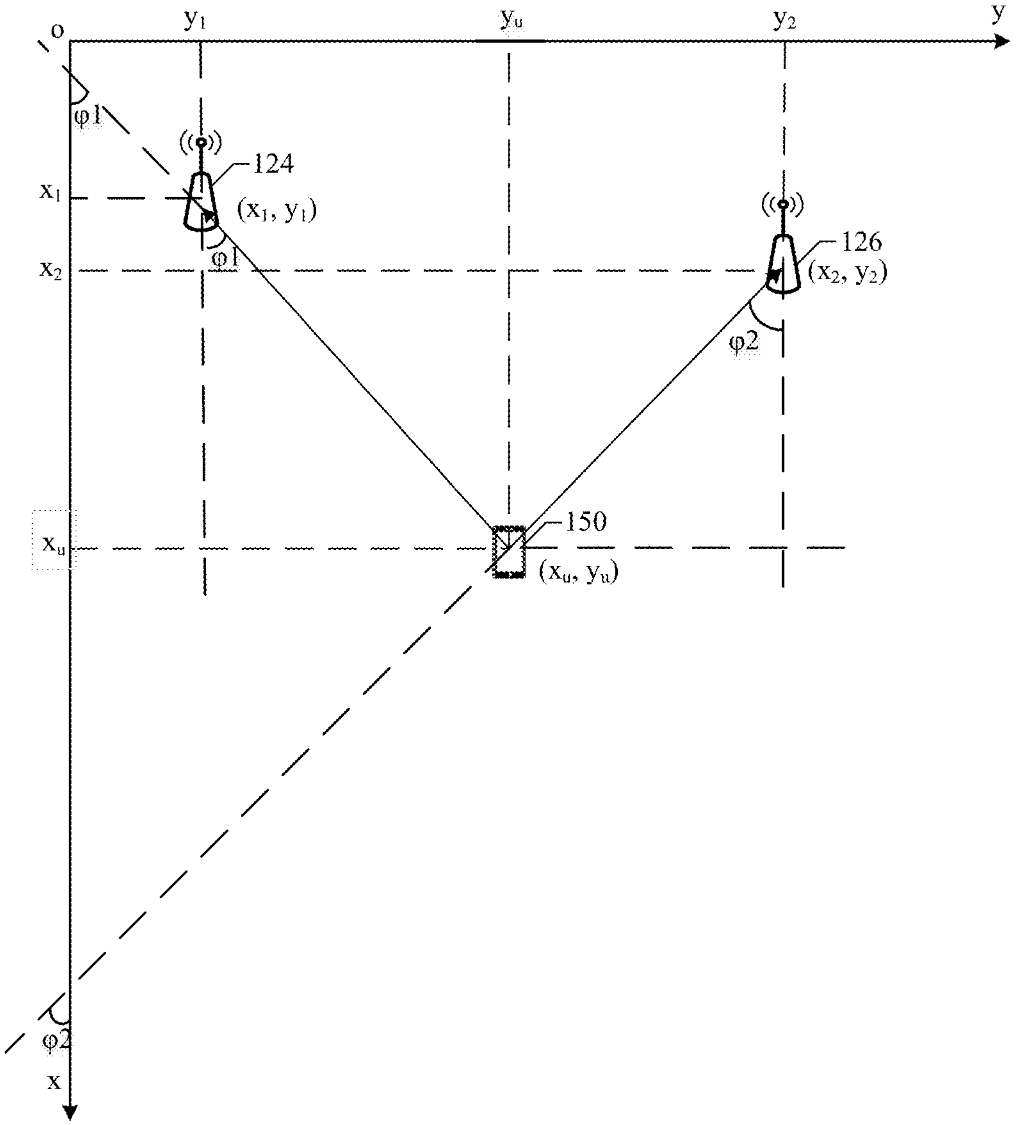
FIG. 7 illustrates a diagram of an angle of arrival measurement in an embodiment of the present disclosure.

FIG. 7 is a diagram of an AoA measurement in one embodiment. The UE 150 sends a SRS and the distributed device 124 and the distributed device 126 separately receive the SRS. As shown in FIG. 7, the coordinate of the distributed device 124 is (x1, y1), and the coordinate of the distributed device 126 is (x2, y2). An angle between the x axis and a vector of the receiving of the SRS is defined as an azimuth angle. An azimuth angle may be an angle measurement in a spherical coordinate system. The vector from an observer (origin) to a point of interest is projected perpendicularly onto a reference plane; the angle between the projected vector and a reference vector on the reference plane is called the azimuth, and vice versa. As in FIG. 7, the azimuth angle of the SRS to the distributed device 124 is $\varphi 1$, and the azimuth angle of the SRS to the distributed device 126 is $\varphi 2$.

In operation 610, the distributed device 124 sends a first uplink SRS measurement report to the central device 122 in a F1AP signaling.

In one example, the first uplink SRS measurement report comprises the AoA measurement result of the SRS measured at the distributed device 124, such as $\varphi 1$. The central device 122 therefore can obtain the AoA measurement result. In another example, the first uplink SRS measurement report comprises the AoA measurement result of the SRS measured at the distributed device 124, along with a corresponding uncertainty estimate. The uncertainty estimate may reflect an uncertainty in the measured AoA, for example, due to the nonzero width of a receive beam formed by the distributed device 124.

If the F1AP signaling in operation 606 comprises the transaction ID X, the F1AP signaling of in operation 610 further comprises the transaction ID X. When the central device 122 receives the F1AP signaling in this operation, the central device 122 can get the AoA measurement result φ1 is associated with the distributed device 124.

Alternatively, the F1AP signaling in operation 610 may further comprise the coordinate information of the distributed device 124. In another example, the coordinate information of the distributed device 124 may be pre-stored on the central device 122.

In operation 611, the distributed device 126 sends a second uplink SRS measurement report to the central device 122 in a F1AP signaling.

The second uplink SRS measurement report comprises the AoA measurement result of the SRS measured at the distributed device 126, such as φ2. The central device 122 can obtain the AoA measurement result accordingly. In one example, the second uplink SRS measurement report comprises the AoA measurement result of the SRS measured at the distributed device 126, along with a corresponding uncertainty estimate.

If the F1AP signaling in operation 607 comprises the transaction ID Y, the fourth F1AP signaling further comprises the transaction ID Y. When the central device 122 receives the F1AP signaling in this operation 611, the central device 122 can get that the AoA measurement result φ2 is associated with the distributed device 126.

In some examples, the transaction ID X and transaction ID Y are different. Therefore, when the central device 122 receives the transaction ID X and transaction ID Y with the associated AoA measurement result, the central device 122 can distinguish the AoA measurement result belongs to which distributed device. Optionally, the transaction ID X and transaction ID Y also could be the same. The central device 122 knows which distributed device originated the F1AP signaling. Thus, the central device 122 can still distinguish the AoA measurement result belongs to which distributed device.

Alternatively, the F1AP signaling in this operation 611 may further comprise the coordinate information of the distributed device 126. In another example, the coordinate information of the distributed device 126 may be pre-stored on the central device 122.

In embodiments of present disclosure, the operations 609 and 610 could be performed simultaneously. Alternatively, the operation 609 is performed prior to the operation 610, or the operation 610 may be performed prior to the operation 609. Or the distributed device 124 and the distributed device 126 may respectively send the AoA measurement results after they get the AoA measurement results. There is no specific sequence is mandatory between the operations 609 and 610.

In operation 612, the central device 122 sends a positioning measurement report to the LMF device 140.

The central device 122 sends an NRPPa message, such positioning measurement initiation response message to the LMF device 140, which includes positioning measurement report that includes the obtained AoA measurement results from the two distributed devices 124 and 126, such as the azimuth angles φ1 and φ2. If the result is expected periodically and the RAN node 120 is able to initiate at least one of the positioning measurements as requested, the RAN node 120 sends an NRPPa positioning measurement initiation response message to the LMF device 140, which does not include any result. The RAN node 120 reports then the obtained measurements by initiating a positioning measurement report procedure, with the requested periodicity.

The positioning measurement initiation response message may also comprise the coordinate information of the distributed devices 124 and 126. Alternatively, the coordinate information of the distributed devices 124 and 126 can be sent to the LMF device 140 prior to the positioning measurement initiation response message.

In operation 613, the LMF device 140 determines the UE 150's position in accordance with the AoA measurement results.

Take the scenario of FIG. 7 as an example, the LMF device 140 obtains the UE 150's position (xu, yu) in accordance with the azimuth angles φ1 and φ2.

The LMF device 140 may have below equations (1) and (2) based on the AoA measurement results and the coordinates of the two distributed devices 124 and 126:

$$\tan(\varphi_1) = \frac{y_u - y_1}{x_u - x_1} \tag{1}$$

$$\tan(\varphi_2) = \frac{y_2 - y_u}{x_u - x_2} \tag{2}$$

The equation (1) can be transformed into:

$$x_u * \tan(\varphi_1) - y_u = x_1 * \tan(\varphi_1) - y_1 \tag{3}$$

The equation (2) can be transformed into:

$$x_u * \tan(\varphi_2) - y_u = x_2 * \tan(\varphi_2) - y_2 \tag{4}$$

Based on equations (3) and (4), xu and yu could be determined as:

$$x_u = \frac{y_2 - y_1 + x_1 * \tan(\varphi_1) + x_2 * \tan(\varphi_2)}{\tan(\varphi_1) + \tan(\varphi_2)}$$

$$y_u = \frac{y2 * \tan(\varphi_1) + y1 * \tan(\varphi_2) + \tan(\varphi_1) * \tan(\varphi_2) * x_2 - \tan(\varphi_1) * \tan(\varphi_2) * x_1}{(\tan(\varphi_1) + \tan(\varphi_2))}$$

Therefore, the coordinate (xu, yu) of the UE 150 can be determined, and the UE 150's position is obtained accordingly. If the AoA measurement results are accompanied by uncertainty estimates, the equations (3) and (4) may be applied to the uncertainty bounds of the measured AoAs, resulting in an uncertainty region surrounding the estimated position of the UE 150.

In one alternative embodiment, the central device 122 may determine the position of the UE 150 according to above equations (1) and (2), and send position information of the UE 150 to the LMF device 140. In another alternative embodiment, the central device 122 may send the AoA measurements and/or uncertainty estimates to the LMF device 140, and the LMF device 140 may determine the estimated position of the UE 150 according to above equations (1) and (2).

Figure 8:
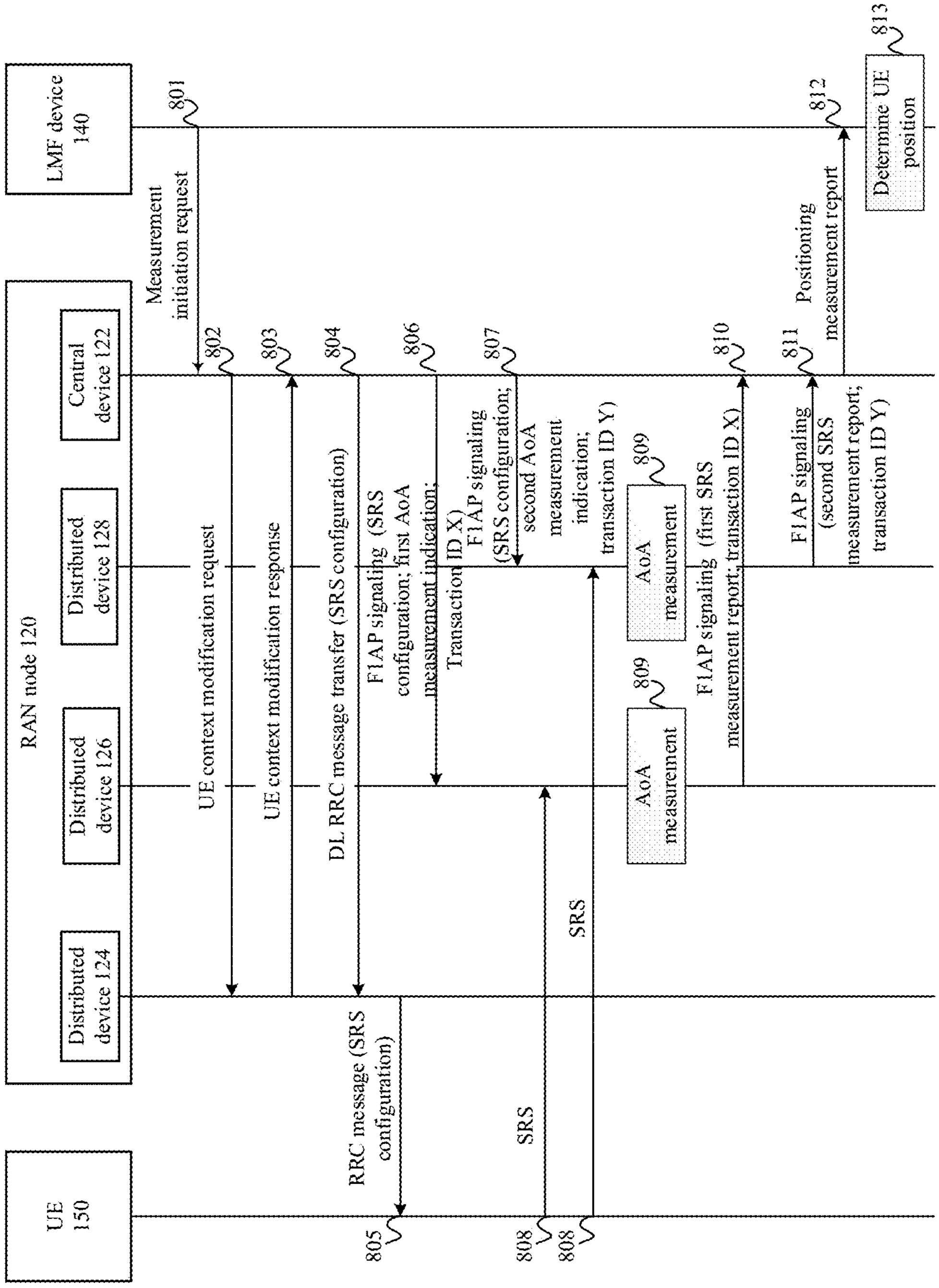
FIG. 8 illustrates a flow diagram of a UE positioning method in an embodiment of the present disclosure.

FIG. 8 is a flow diagram of a UE positioning method in an embodiment of the present disclosure. The RAN node 120 comprises a central device 122 and three distributed devices 124 and 126, in which the distributed device 124 is a serving distributed device of the UE 150. The distributed devices 126 and 128 are two non-serving distributed devices. In this embodiment, the central device 122 can configure the SRS configuration information to the two non-serving distributed devices 126 and 128 in F1AP signaling. The position of the UE 150 can be determined according to AoA measurement results performed at the two non-serving distributed devices 124 and 126.

In the embodiment illustrated by FIG. 8, the operations 801-805 are similar to the operations 601-605 as illustrated in FIG. 6. The LMF device 140 sends a positioning measurement initiation request message to the central device 122. The central device 122 sends a UE context modification request message in a F1AP signaling to the serving distributed device 124 and receives a successful response from the serving distributed device 124. The central device 122 further sends the SRS configuration information to the UE 150 through the serving distributed device 124 in a RRC message.

In operations 806 and 807, the central device 122 sends the SRS configuration information to the non-serving distributed devices 126 and 128 in two separate F1AP signaling, the first F1AP signaling and the second F1AP signaling. Optionally, the first F1AP signaling further comprises a transaction ID X, and the second F1AP signaling further comprises a transaction ID Y. The first F1AP and second F1AP signaling may further comprise an AoA measurement indication. Alternatively, the AoA measurement or the transaction IDs may be transmitted in different F1AP signaling rather than the first and second F1AP signaling. It is noted that, in the embodiments of present disclosure, the operations 806 and 807 could be performed simultaneously. Alternatively, the operation 806 is performed prior to the operation 807, or the operation 807 may be performed prior to the operation 806. There is no specific sequence is mandatory between the operations 806 and 807.

In the operation 808, the UE 150 sends an uplink SRS.

Operations 809-813 are similar to the operations 609 to 613 except that two non-serving distributed devices 126 and 128 perform the AoA measurement and report uplink SRS measurement results to the central device 122. The non-serving distributed devices 126 and 128 make AoA measurements of the SRS sent from the UE 150. The non-serving distributed devices 126 sends a first uplink SRS measurement result in a third F1AP signaling. The non-serving distributed devices 128 sends a second uplink SRS measurement result in a fourth F1AP signaling. Optionally, the third F1AP signaling may comprise the transaction ID X and the fourth F1AP signaling may comprise the transaction ID Y. The central device 122 sends the first uplink SRS measurement result and the second SRS measurement result to the LMF device 140. The LMF device 140 then can determine the location of the UE 150 based on the two uplink SRS measurement result.

Figure 9:
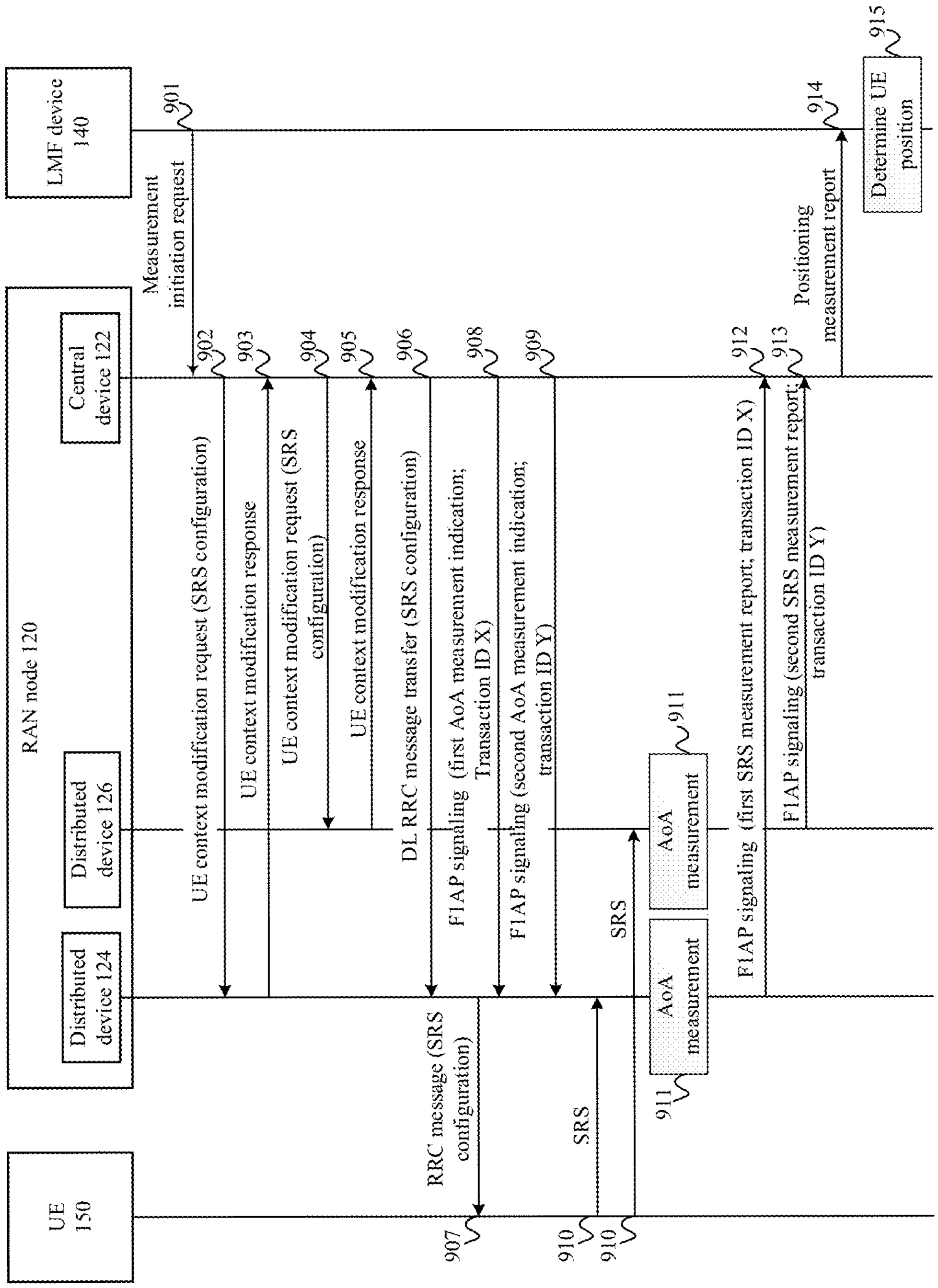
FIG. 9 illustrates a flow diagram of a UE positioning method in an embodiment of the present disclosure.

FIG. 9 is a flow diagram of a UE positioning method in an embodiment of the present disclosure. Similar to the embodiment illustrated in FIG. 6, the RAN node 120 comprises the central device 122 and two distributed device 124 and 126. In this embodiment, the UE 150's position can be determined based on the AoA measurement results of an uplink SRS performed at the two distributed device. The difference from the FIG. 6 is that the two distributed device 124 and 126 are serving distributed devices of the UE 150. For example, the two distributed devices are assigned to the UE 150, and each of the two distributed devices has UE context of the UE 150.

The operation 901 is similar to the operation 601. In this embodiment, the LMF device 140 sends a positioning measurement initiation request message to the central device 122.

In operations 902-905, the central device 122 sends an UE context modification request message to the distributed device 124 and 126 separately and the distributed device 124 and 126 respond an UE context modification response to the central device 122, similar to the operations 601 and 602. In the UE context modification request, uplink SRS configuration information is comprised.

The operations 906 and 907 are similar to the operations 604 and 605. The central device 122 sends the uplink SRS configuration information to the UE 150 through the serving distributed device 124 or 126 in an RRC message. In some embodiments, the uplink SRS configuration information may be sent to the UE 150 through both of the serving distributed devices 124 and 126.

In operations 908 and 909, the central device 122 sends a first F1AP signaling to the distributed device 124 and a second F1AP signaling to the distributed device 126. The first F1AP signaling and the second F1AP signaling comprise an AoA measurement indication. Alternatively, the AoA measurement indication may be transmitted in different F1AP signaling rather than the first and second F1AP signaling. Optionally, the first F1AP signaling further comprises a transaction ID X, and the second F1AP signaling further comprises a transaction ID Y. Alternatively, the transaction IDs may be transmitted in different F1AP signaling rather than the first and second F1AP signaling.

Operations 910 to 915 are similar to the operations 608 to 613. The UE 150 sends an uplink SRS, and the two serving distributed devices 124 and 126 detect the uplink SRS in accordance with the SRS configuration information. The serving distributed devices 124 and 126 can make AoA measurements of the uplink SRS separately. The distributed 124 sends a first SRS measurement result in a third F1AP signaling to the central device 122, and the distributed 126 sends a second SRS measurement result in a fourth F1AP signaling to the central device 122. Optionally, the third F1AP signaling may comprise the transaction ID X and the fourth F1AP signaling may comprise the transaction ID Y. The central device 122 sends the first uplink SRS measurement result and the second SRS measurement result to the LMF device 140. The LMF device 140 then can determine the location of the UE 150 based on the two uplink SRS measurement results.

Figure 10:
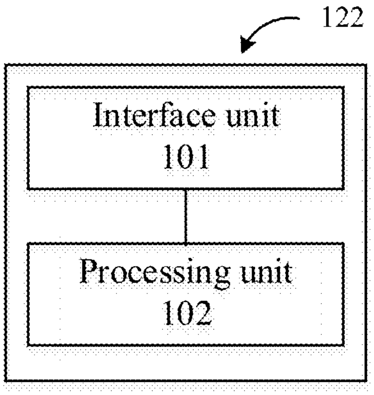
FIG. 10 illustrates a block diagram of a central device in an embodiment of the present disclosure.

FIG. 10 is a block diagram of the central device 122 in an embodiment of the present disclosure. The central device 122 comprises an interface unit 101 and a processing unit 102.

The interface unit 101 is configured to communicate with a core network device 130 and with at least two distributed devices. Optionally, the interface unit 101 supports two interfaces, one is the NG interface between the core network device 130 and the central device 122; another is the F1 interface between the central device 122 and the distributed device 124, 126, or 128. The interface unit 101 is configured to receive a positioning measurement initiation request message from the LMF device 140.

The processing unit 102 is configured to configure uplink signal configuration information upon the interface unit 101 receives the positioning measurement initiation request message, and sends the uplink signal configuration information to at least two distributed devices in F1AP signaling through the interface unit 101. The processing unit 102 is further configured to send the uplink signal configuration information in an RRC message to the UE 150.

The interface unit 101 is further configured to receive a positioning measurement report from the at least two distributed devices through F1AP signaling. The processing unit 102 is further configured to send the positioning measurement report to the LMF device 140.

The interface unit 101 and the processing unit 102 as illustrated in FIG. 10 may be implemented with one or more features of any one or more of the embodiments related to the central device 122 set forth in any previous and/or subsequent figure(s) and/or the description thereof.

Figure 11:
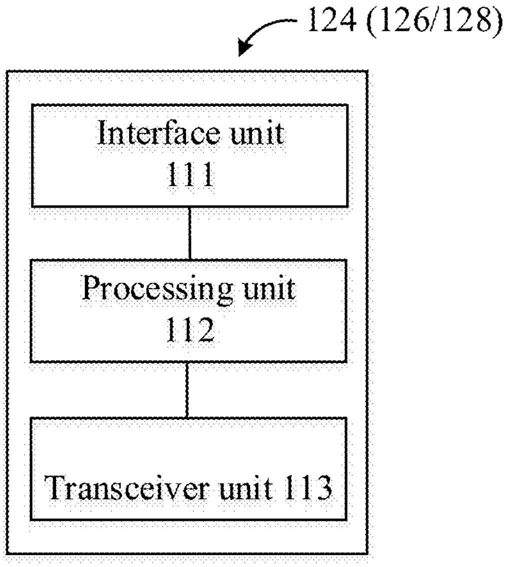
FIG. 11 illustrates a block diagram of a distributed device in an embodiment of the present disclosure.

FIG. 11 is a block diagram of a distributed device 124, 126, or 128 in an embodiment of the present disclosure. The distributed device 124, 126, or 128 comprises an interface unit 111, a processing unit 112, and a transceiver unit 113.

The interface unit 111 is configured to communicate with the central device 122. The interface unit 111 may support a F1 interface between the distributed device 124, 126, or 128 and the central device 122. The interface unit 111 is configured to receive uplink signal configuration from the central device 122 in F1AP singling. The interface unit 111 is further configured to receive an AoA measurement indication in the F1AP signaling. The F1AP signaling may further comprise a transaction ID.

The processing unit 112 may be configured to receive an uplink signal from the UE 150 in accordance with the uplink signal configuration information through the transceiver unit 113, and makes an AoA measurement on the uplink signal. The interface unit 111 may further send an uplink signal measurement result to the central device 122.

The interface unit 111, the processing unit 112, and the transceiver unit 113 as illustrated in FIG. 11 may be implemented with one or more features of any one or more of the embodiments related to the distributed devices 124, 126, and 128 set forth in any previous and/or subsequent figure(s) and/or the description thereof.

Figure 12:
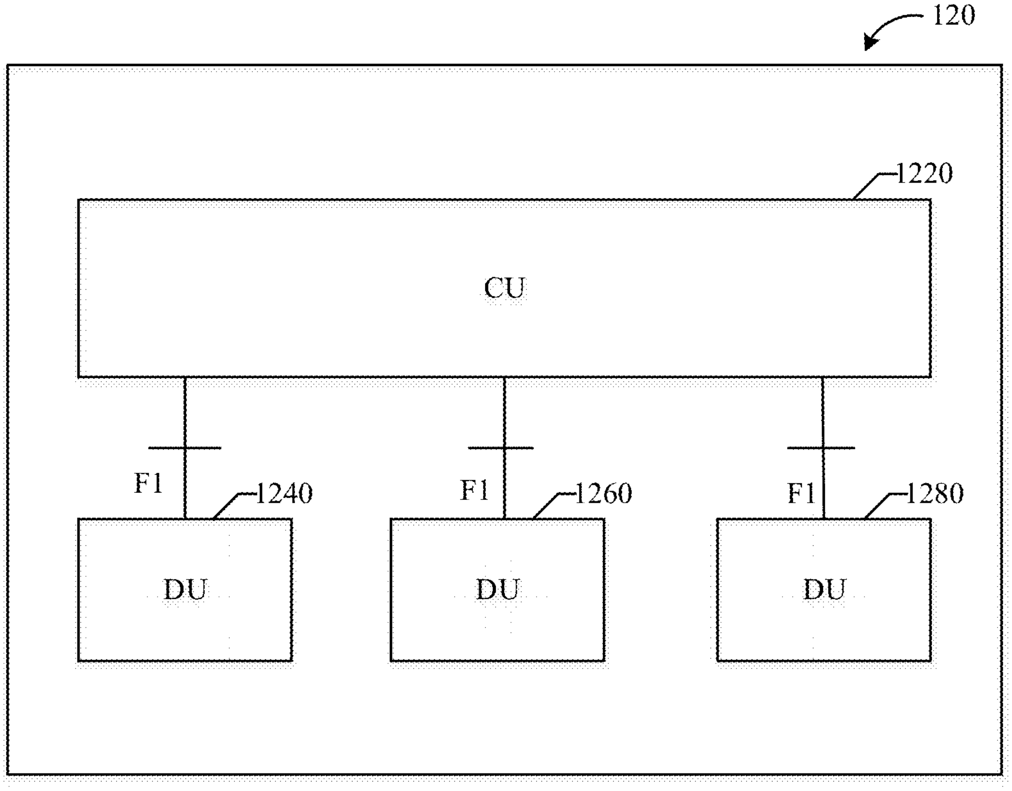
FIG. 12 illustrates a diagram of an RAN node in an embodiment of the present disclosure.

FIG. 12 is a diagram of the RAN node 120 in an embodiment of the present disclosure. The RAN node 120 comprises a central unit (CU) 1220 and at least two distributed units (DUs), such as 1240, 1260, or 1280. The central unit 1220, the distributed units 1240, 1260, and 1280 may make reference to the above central device 122, the distributed devices 124, 126, and 128 respectively.

The central unit 122 is configured to receive positioning measurement request information from a LMF device 140, send uplink signal configuration information to a first distributed unit and a second distributed unit of the at least two distributed units, wherein the uplink signal configuration information is sent to a first distributed unit through a first application protocol signaling and the uplink signal configuration information is sent to a second distributed unit through a second application protocol signaling. The central unit 1220 is further to receive a positioning measurement report comprising a first uplink signal measurement report from the first distributed unit though a third application protocol signaling and a second uplink signal measurement report from the second distributed unit through a fourth application protocol signaling, and send the positioning measurement report to the LMF device.

Each of the first and the second distributed unit is configured to receive uplink signal configuration information in an application protocol signaling from the central unit 1220, measure an uplink signal sent from a user equipment 150 in accordance with the uplink signal configuration, sends a uplink signal measurement report in an application protocol signaling to the central unit 1220.

The central unit 1220 and the at least two distributed units 1240, 1260, and 1280 as illustrated in FIG. 12 may be implemented with one or more features of any one or more of the embodiments related to the central device 122 and the distributed devices 124, 126, and 128 set forth in any previous and/or subsequent figure(s) and/or the description thereof.

An embodiment provides a non-transitory computer-readable medium storing computer instructions that when executed by one or more processors, cause the one or more processors to receive positioning measurement request information from a LMF device 140, send uplink signal configuration information to a first distributed device and a second distributed device of the at least two distributed devices, wherein the uplink signal configuration information is sent to a first distributed device through a first application protocol signaling and the uplink signal configuration information is sent to a second distributed device through a second application protocol signaling. One or more processors are further caused to receive a positioning measurement report comprising a first uplink signal measurement report from the first distributed device though a third application protocol signaling and a second uplink signal measurement report from the second distributed device through a fourth application protocol signaling, and send the positioning measurement report to the LMF device 140. The computer instructions that when executed by one or more processors, cause the one or more processors to implement with one or more features of any one or more of the embodiments related to the central device 122 set forth in any previous and/or subsequent figure(s) and/or the description thereof.

Another embodiment of the present discloses provides another non-transitory computer-readable medium storing computer instructions that when executed by one or more processors, cause the one or more processors to receive uplink signal configuration information in an application protocol signaling from the central device 122, measure an uplink signal sent from a user equipment 150 in accordance with the uplink signal configuration, and send a uplink signal measurement report in an application protocol signaling to the central device 122. The computer instructions that when executed by one or more processors, cause the one or more processors to implement with one or more features of any one or more of the embodiments related to the distributed devices 124, 126, and 128 set forth in any previous and/or subsequent figure(s) and/or the description thereof.

One embodiment of present disclosure provides a chipset system, the chipset system includes a processor that is used to implement the functionality of the central device 122, the distributed device 124, 126, or 128, the UE 150, or the LMF device 140. The chipset system may further include a memory for storing program instructions and data. The chipset system may be comprised of chipsets, and may also be comprised by at least one of chipsets and other discrete device.

It should be appreciated that one or more operations of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other operations may be performed by other units/modules. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or operations, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or operations.

The terminology used in the description of the present disclosure is for the purpose of describing particular embodiments only and is not intended to be limiting of the present disclosure. As used in the description of the present disclosed and the appended claims, the singular forms "a", "an" and "the" are intended to include the plural forms as well, unless the context clearly indicates otherwise. In the embodiments of the present disclosure, "at least one" means one or multiple. The term "multiple" means two or more than two. The term "and/or" describes a relationship between the associated items. The term "and/or" may represent three relationships. For example, "A and/or B" may represent situations of A independently, A and B concurrently, and B independently. Where A and B could be singular or plural. The symbol "/" usually means "or" of the associated items. The expression "at least one item of" or similar expressions may mean any combination of the items, including any combination of singular item, or the plural of items. For instance, at least one of a, b, or c may comprise a, b, c, a plus b, a plus c, b plus c, or a plus b plus c, where a, b, c may be singular, or may be plural.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method, comprising:

receiving, by a first distributed device of a radio access network (RAN) node from a central device of the RAN node, first uplink signal configuration information;

measuring, by the first distributed device, an uplink signal from a user equipment (UE) in accordance with the first uplink signal configuration information; and sending, by the first distributed device to the central device, a first uplink signal measurement result of the uplink signal for determination of a position of the UE.

2. The method of claim 1, the measuring the uplink signal comprising:

sending, by the first distributed device to the UE, the first uplink signal configuration information; and receiving, by the first distributed device from the UE, the uplink signal in accordance with the first uplink signal configuration information.

3. The method of claim 2, wherein the uplink signal is a sounding reference signal (SRS), and wherein the first uplink signal configuration information indicates an SRS resource configuration.

4. The method of claim 1, further comprising:

receiving, by the first distributed device from the central device, information indicating a positioning measurement type corresponding to the first uplink signal configuration information.

5. The method of claim 4, the positioning measurement type being an angle of arrival (AoA) measurement type.

6. The method of claim 1, wherein the first distributed device receives the first uplink signal configuration information in an F1 interface application protocol (F1AP) signaling over an F1 interface.

7. The method of claim 1, the central device hosting a radio resource control (RRC) layer of the RAN node, the first distributed device hosting a physical layer of the RAN node.

8. The method of claim 1, further comprising:

receiving, by a second distributed device of the RAN node from the central device, second uplink signal configuration information;

measuring, by the second distributed device, the uplink signal in accordance with the second uplink signal configuration information; and sending, by the second distributed device to the central device, a second uplink signal measurement result of the uplink signal for the determination of the position of the UE.

9. A first distributed device, comprising:

at least one processor; and a non-transitory computer readable storage medium storing programming, the programming including instructions that, when executed by the at least one processor, cause the first distributed device to perform operations including:

receiving, from a central device of a radio access network (RAN) node, first uplink signal configuration information;

measuring an uplink signal from a user equipment (UE) in accordance with the first uplink signal configuration information; and sending, to the central device, a first uplink signal measurement result of the uplink signal for determination of a position of the UE.

10. The first distributed device of claim 9, the measuring the uplink signal comprising:

sending, to the UE, the first uplink signal configuration information; and receiving, from the UE, the uplink signal in accordance with the first uplink signal configuration information.

11. The first distributed device of claim 10, wherein the uplink signal is a sounding reference signal (SRS), and wherein the first uplink signal configuration information indicates an SRS resource configuration.

12. The first distributed device of claim 9, the operations further comprising:

receiving, from the central device, information indicating a positioning measurement type corresponding to the first uplink signal configuration information.

13. The first distributed device of claim 12, the positioning measurement type being an angle of arrival (AoA) measurement type.

14. The first distributed device of claim 9, wherein the first distributed device receives the first uplink signal configuration information in an F1 interface application protocol (F1AP) signaling over an F1 interface.

15. The first distributed device of claim 9, the central device hosting a radio resource control (RRC) layer of the RAN node, the first distributed device hosting a physical layer of the RAN node.

16. The first distributed device of claim 9, the RAN node further comprising a second distributed device configured to:

receive, from the central device, second uplink signal configuration information;

measure the uplink signal in accordance with the second uplink signal configuration information; and send, to the central device, a second uplink signal measurement result of the uplink signal for the determination of the position of the UE.

17. At least one non-transitory computer-readable medium having instructions stored thereon that, when executed by a first distributed device, cause the first distributed device to perform operations, the operations comprising:

receiving, from a central device of a radio access network (RAN) node, first uplink signal configuration information;

measuring an uplink signal from a user equipment (UE) in accordance with the first uplink signal configuration information; and sending, to the central device, a first uplink signal measurement result of the uplink signal for determination of a position of the UE.

18. The at least one non-transitory computer-readable medium of claim 17, the measuring the uplink signal comprising:

sending, to the UE, the first uplink signal configuration information; and receiving, from the UE, the uplink signal in accordance with the first uplink signal configuration information.

19. The at least one non-transitory computer-readable medium of claim 18, wherein the uplink signal is a sounding reference signal (SRS), and wherein the first uplink signal configuration information indicates an SRS resource configuration.

20. The at least one non-transitory computer-readable medium of claim 17, the operations further comprising:

receiving, from the central device, information indicating a positioning measurement type corresponding to the first uplink signal configuration information.

* * * * *